United States Patent
Wang et al.

(10) Patent No.: US 11,708,470 B2
(45) Date of Patent: Jul. 25, 2023

(54) PLASTIC SUBSTRATE ADHESION PROMOTER WITH RANDOM COPOLYMER

(71) Applicant: PPG Industries Ohio, Inc., Cleveland, OH (US)

(72) Inventors: Wei Wang, Allison Park, PA (US); Chinming Hui, Pittsburgh, PA (US); Lan Deng, Pittsburgh, PA (US); Stephen John Thomas, Aspinwall, PA (US); Terri Lynn Ziegler, Maple Grove, MN (US); Richard Alan Janoski, Sr., Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 365 days.

(21) Appl. No.: 15/386,361

(22) Filed: Dec. 21, 2016

(65) Prior Publication Data

US 2018/0171170 A1 Jun. 21, 2018

(51) Int. Cl.
| | |
|---|---|
| *C09D 133/00* | (2006.01) |
| *C08J 7/043* | (2020.01) |
| *C09D 133/08* | (2006.01) |
| *C09D 133/12* | (2006.01) |
| *C08J 7/04* | (2020.01) |
| *B05D 7/02* | (2006.01) |
| *B05D 5/04* | (2006.01) |
| *B05D 1/36* | (2006.01) |
| *B05D 3/00* | (2006.01) |
| *C08F 220/18* | (2006.01) |

(52) U.S. Cl.
CPC ............... *C08J 7/043* (2020.01); *B05D 1/36* (2013.01); *B05D 3/002* (2013.01); *B05D 5/04* (2013.01); *B05D 7/02* (2013.01); *C08F 220/1811* (2020.02); *C08J 7/042* (2013.01); *C08J 7/0427* (2020.01); *C09D 133/08* (2013.01); *C09D 133/12* (2013.01); *C08J 2323/12* (2013.01); *C08J 2433/08* (2013.01); *C08J 2433/12* (2013.01)

(58) Field of Classification Search
CPC ... C09D 133/08; C09D 133/12; C08F 220/18; B05D 3/002; B05D 1/36; B05D 7/02; B05D 5/04; C08J 7/042; C08J 7/047; C08J 2433/12; C08J 2433/08; C08J 2323/12

See application file for complete search history.

(56) References Cited

U.S. PATENT DOCUMENTS

| | | |
|---|---|---|
| 3,394,029 A | 7/1968 | MacArthur |
| 5,446,083 A | 8/1995 | Stevens et al. |
| 5,684,084 A | 11/1997 | Lewin et al. |
| 6,187,854 B1 | 2/2001 | Spinelli et al. |
| 6,413,306 B1 | 7/2002 | Kraiter et al. |
| 6,437,040 B2 | 8/2002 | Anthony et al. |
| 6,576,722 B2 | 6/2003 | Coca et al. |
| 6,825,290 B2 | 11/2004 | Adam et al. |
| 7,438,952 B2 | 10/2008 | Connelly et al. |
| 8,466,218 B2 | 6/2013 | December et al. |
| 9,580,619 B2 | 2/2017 | Ogura et al. |
| 2003/0100675 A1 | 5/2003 | Goetz et al. |
| 2003/0187136 A1 | 10/2003 | Maier et al. |
| 2004/0071871 A1 | 4/2004 | Queval et al. |
| 2004/0120906 A1 | 6/2004 | Toumi et al. |
| 2005/0197455 A1 | 9/2005 | Schang et al. |
| 2006/0013958 A1 | 1/2006 | Connelly et al. |
| 2006/0258808 A1 | 11/2006 | Kania et al. |
| 2006/0286382 A1* | 12/2006 | Anzures ............... C08J 7/043 428/411.1 |
| 2007/0129485 A1 | 6/2007 | Iida et al. |
| 2007/0237902 A1* | 10/2007 | Ragunathan ......... C09D 133/06 427/407.1 |
| 2008/0305265 A1 | 12/2008 | Connelly et al. |
| 2009/0042020 A1 | 2/2009 | Ferencz et al. |
| 2011/0118372 A1 | 5/2011 | Lester et al. |
| 2012/0196143 A1 | 8/2012 | Schellekens et al. |
| 2013/0251944 A1* | 9/2013 | Kian ..................... C09J 7/29 428/354 |
| 2013/0263875 A1 | 10/2013 | Burgess et al. |
| 2014/0037975 A1 | 2/2014 | Schellekens et al. |

(Continued)

FOREIGN PATENT DOCUMENTS

| | | | |
|---|---|---|---|
| CN | 1087364 A | * | 6/1994 |
| CN | 104136134 B | | 5/2017 |

(Continued)

OTHER PUBLICATIONS

Lawniczak et al., "Characterization of Adhesion Performance of Topcoats and Adhesion Promoters on TPO Substrates", JCT Research, 2003, pp. 399-405, vol. 2, No. 5.

"Methacryloxypropyltrimethoxysilane", Gelest, Inc., 2021, pp. 1-3 [Accessed Jun. 2021].

(Continued)

*Primary Examiner* — Taiwo Oladapo

(74) *Attorney, Agent, or Firm* — Krisanne Shideler

(57) ABSTRACT

Disclosed is a resinous adhesion promoter comprising (a) a random copolymer having first and second constitutional monomeric units, the first units comprising halogen and/or a pendant organic group having six or more carbon atoms and the second monomeric units comprising an active hydrogen-containing functional group; and (b) one of either (i) a non-reactive adhesion promoter or (ii) a reaction mixture comprising a first component and a second component, at least one of the first and second components having functional groups being reactive with the active hydrogen-containing functional groups of the random copolymer.

9 Claims, No Drawings

(56) References Cited

U.S. PATENT DOCUMENTS

| | | | |
|---|---|---|---|
| 2014/0113070 A1 | | 4/2014 | Shumann et al. |
| 2014/0113990 A1 | | 4/2014 | Spiegel et al. |
| 2015/0037591 A1 | * | 2/2015 | Ishikura ................. C09D 5/024 |
| | | | 428/423.1 |
| 2015/0307668 A1 | | 10/2015 | Kalgutkar et al. |
| 2015/0361317 A1 | * | 12/2015 | Janowicz .............. C08F 220/18 |
| | | | 428/355 AC |
| 2015/0376476 A1 | | 12/2015 | Rahim et al. |
| 2016/0152868 A1 | * | 6/2016 | Yoon .......................... C09J 7/10 |
| | | | 428/220 |
| 2016/0152876 A1 | | 6/2016 | Kim et al. |
| 2016/0326290 A1 | | 11/2016 | Kumar et al. |

FOREIGN PATENT DOCUMENTS

| | | | | |
|---|---|---|---|---|
| EP | 0560508 | A1 | | 9/1993 |
| EP | 1185571 | A2 | | 3/2002 |
| GB | 1109746 | | | 4/1968 |
| JP | 05310972 | A | | 11/1993 |
| JP | 8199036 | A | | 8/1996 |
| JP | 8311397 | A | | 11/1996 |
| JP | 2816617 | A | * | 8/1998 |
| JP | 2816617 | B2 | | 10/1998 |
| JP | 200645316 | A | | 2/2006 |
| JP | 200799883 | A | | 4/2007 |
| JP | 2009533524 | A | | 9/2009 |
| JP | 2009269975 | A | | 11/2009 |
| JP | 2010515809 | A | | 5/2010 |
| JP | 2010180283 | A | | 8/2010 |
| JP | 2013249426 | A | | 12/2013 |
| JP | 2014133786 | A | | 7/2014 |
| JP | 5652955 | B2 | | 1/2015 |
| KR | 20140121173 | A | * | 10/2014 ................ C09J 4/06 |
| WO | 0198419 | A1 | | 12/2001 |
| WO | WO-2007050213 | A2 | * | 5/2007 ......... C08G 18/6208 |
| WO | 2008088770 | A1 | | 7/2008 |
| WO | 2013191104 | A1 | | 12/2013 |

OTHER PUBLICATIONS

Chen et al., "Silanes in High-Solids and Waterborne Coatings", Journal of Coatings Technology, Jul. 1997, pp. 43-51, vol. 69:870.
Lee et al., "Curing Behavior and Viscoelasticity of Dual-Curable Adhesives Based on High-Reactivity Azo Initiator", Journal of Electronic Materials, 2016, pp. 3786-3794, vol. 45:7.
Marcu et al., "Incorporation of Alkoxysilanes into Model Latex Systems: Vinyl Copolymerization of Vinyltriethoxysilane and n-Butyl Acrylate", Macromolecules, 2003, pp. 328-332, vol. 36.
Park et al., "Characterization of an acrylic polymer under hygrothermal aging as an optically clear adhesive for touch screen panels", International Journal of Adhesion and Adhesives, 2015, pp. 137-144, vol. 63.
Qie et al., "The influence of butyl acrylate/methyl methacrylate/2-hydroxy ethyl methacrylate/acrylic acid latex properties on pressure sensitive adhesive performance", International Journal of Adhesion and Adhesives, 2010, pp. 654-664, vol. 30.
Qie et al., "Manipulation of chain transfer agent and cross-linker concentration to modify latex micro-structure for pressure-sensitive adhesives", European Polymer Journal, 2010, pp. 1225-1236, vol. 46.
Xi et al., "A Study on Poly(Vinyl Chloride) Blends With Chlorinated Polyethylene and Acrylic Resin", Polymer Engineering and Science, Mar. 1987, pp. 398-401, vol. 27:6.
Zhang et al., "Polyacrylate emulsion containing IBOMA for removable pressure sensitive adhesives", Journal of Applied Polymer Science, 2016, 7 pages.
"(3-Mercaptopropyl)trimethoxysilane: 95%", Millipore Sigma, Nov. 2021, pp. 1-4.
"Isobornyl acrylate: 98.5%", Millipore Sigma, Nov. 2021, pp. 1-4.
"Octadecyl acrylate: contains 200 ppm monomethyl ether hydroquinone as inhibitor, 97%", Millipore Sigma, Nov. 2021, pp. 1-4.

* cited by examiner

US 11,708,470 B2

PLASTIC SUBSTRATE ADHESION PROMOTER WITH RANDOM COPOLYMER

FIELD OF THE INVENTION

The present invention relates to coating compositions having adhesion to polymeric substrates.

BACKGROUND OF THE INVENTION

Polymers are used in a wide variety of molded articles for use in the automotive, industrial, and appliance markets, among others. Vehicles, for example, include many interior and exterior parts and attachments that are constructed from polymers, such as mirror casings, fenders, bumper covers, spoilers, dashboards, interior trim, and the like. Such articles generally are prepared by molding an article from a polyolefin or other resin and applying to the molded article one or more film-forming coating layers to protect and/or color the article. One of the difficulties associated with the use of polymeric substrates is that typical film-forming compositions used for protective and/or decorative coatings may not adhere. In refinishing molded articles constructed from polymers, for example, addition of an adhesion promoting layer can make the refinishing process complex, time-consuming, and expensive. Coatings and methods to reduce this time and complexity are therefore desired. In order to improve the adhesion the plastic substrates are conventionally specifically pretreated, e.g. by wiping with an adhesion promoter such as chlorinated polyolefin (CPO). Certain prior art adhesion promoting layers were not suitable as protective and/or decorative coatings. Enhanced adhesion to polymeric substrates is desired.

SUMMARY OF THE INVENTION

The present invention includes a resinous adhesion promoter composition comprising: (a) a random copolymer having first and second constitutional monomeric units, the first monomeric units comprising functional groups that promote adhesion to a polymeric substrate and the second monomeric units comprising an active hydrogen containing functional group; and (b) one of either (i) a non-reactive adhesion promoter or (ii) a reaction mixture comprising a first component and a second component, at least one of the first and second components having functional groups being reactive with the random copolymer (a). Such resinous adhesion promoter composition is suitable as a coating composition. The present invention includes a substrate at least partially coated with the afore-described resinous adhesion promoter composition. Also included in the present invention is a method of enhancing adhesion of a coating composition to a polymeric substrate comprising (1) applying a pretreatment composition comprising a fatty acid ester to at least a portion of a polymeric substrate to provide a treated substrate and (2) applying the above-described resinous adhesion promoter composition directly onto the treated substrate.

The invention also includes a multi-layer coating comprising: a first coating layer formed from a resinous adhesion promoter composition as defined above applied over at least a portion of a polymeric substrate, and a second coating layer formed from a basecoat composition and/or a clearcoat composition applied over at least a portion of the first coating layer.

The invention also includes a method of treating a polymeric substrate comprising (1) cleaning at least a portion of a polymeric substrate, and (2) applying a resinous adhesion promoter composition as defined above directly onto the cleaned portion, wherein step (2) directly follows step (1) with no steps in between.

DESCRIPTION OF THE INVENTION

For the purposes of the following detailed description, it is to be understood that the invention may assume various alternative variations and step sequences, except where expressly specified to the contrary. It is also to be understood that the specific compositions, coated substrates, multilayer coatings and methods described in the following specification are simply exemplary embodiments of the invention. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The present invention is generally directed to resinous adhesion promoter compositions also referred to as coating compositions having adhesion to polymeric substrates. Phrases such as "having adhesion" or "promote adhesion" or the like in reference to a composition refer to a feature of that composition that reduces, if not avoids, delamination of a film-forming composition or film formed therefrom from a substrate, and phrases such as "adhesion promoter" refer to a component that, when included in a composition, promotes adhesion of the composition to a substrate. The present coating compositions generally comprise a random copolymer as an adhesion promoter, wherein one type of the monomeric units of the random copolymer comprises halogen and/or a pendant organic group having six or more carbon atoms and another type of monomeric units of the random copolymer comprises an active hydrogen-containing functional group. Methods of treating and/or coating polymeric substrates using these coating compositions are also within the scope of the present invention.

Random Copolymer (a)

Reference is made herein to a random copolymer composed of at least two types of monomeric units. In the context of the present invention the phrases "constitutional monomeric units", "constituting monomeric units" or "monomeric units" are used to designate the basic structural units associated to each other by covalent bonds to form the polymer chain being derived from polymerization of the respective unsaturated monomers. By random polymer it is meant that the different constituting monomeric units are distributed along the polymer chain in a random order as opposed to block copolymers, wherein the different types of monomeric units are arranged blockwise. The random copolymer can have any number of different types of constituting monomeric units (at least two) and any number of monomer units. The random copolymer may have a number average molecular weight (Mn) of at least 1,000 g/mol and up to 10,000 g/mol or up to 20,000 g/mol as measured by gel permeation chromatography using polystyrene standards.

As used herein, "(meth)acrylate" and like terms refers both to the acrylate and the corresponding methacrylate. The terms "resin" and "resinous" and like terms are used interchangeably with "polymer" and "polymeric" and the like. Further, the term "polymer" refers to oligomers and homopolymers (e.g., prepared from a single monomer species), copolymers (e.g., prepared from at least two monomer species), polymers prepared with more than two, such as three or more, monomer species, and graft polymers.

A resinous adhesion promoter composition according to the present invention comprises (a) a random copolymer having at least first and second types of monomeric units. The first monomeric units comprise a halogen substituent and/or a pendant organic group having six or more carbon atoms. The second monomeric units comprise an active hydrogen-containing functional group. The resinous adhesion promoter composition according to the present invention comprises further (b) one of either (i) a non-reactive adhesion promoter or (ii) a reaction mixture comprising a first component and a second component, at least one of the first and second components having functional groups being reactive with the active hydrogen-containing groups of the random copolymer, but containing not both of (i) and (ii). It will be appreciated, therefore, that the random copolymer is capable of reacting with the first and/or second component.

The first monomeric units of the random copolymer (a) comprise as set forth above a halogen substituent and/or a pendant organic group having six or more carbon atoms. The first monomeric units are included in the copolymer to promote adhesion to a polymeric substrate. The halogen substituent may be Cl or any of F, Cl, Br, and I. The pendant organic group can have for example from 6 to 20 carbon atoms such as from 8 to 18 carbon atoms. It can be a hydrocarbon group such as an alkyl, cycloalkyl, aryl, aralkyl, alkylcycloalkyl or alkylaryl group or include one or more heteroatom(s) (meaning atoms different from C and H) such as e.g. oxygen or nitrogen. Unlike the second monomeric units, the first monomeric units generally do not comprise active hydrogen-containing functional groups though. The first monomeric units can be derived from respective ethylenically unsaturated monomers used in the preparation of the copolymer. Thus the first monomeric units can be derived from one or more than one ethylenically unsaturated monomer having one or more halogen atom and/or one or more organic substituent having six or more carbon atoms. Suitable monomers include for example, without being limited thereto, esters or amides of unsaturated acids such as acrylic acid or (alkyl)acrylic acids, e.g. (meth)acrylic acid (esters or amides of acrylic acid and/or of methacrylic acid being referred to herein collectively as "(meth)acrylates" or (meth)acrylamides, respectively) with a $C_{6+}$ organic group bound via the ester bond or as N-bound substituent. Such ester monomers can be exemplified without being limited thereto by alkyl(meth)acrylate, cycloalkyl (meth)acrylate, alkylcyclo(meth)acrylate, aralkyl(meth) acrylate, alkylaryl(meth)acrylate or aryl(meth)acrylate monomers or heteroatom-containing derivatives thereof, such as isobornyl(meth)acrylate, isodecyl(meth)acrylate, lauryl(meth)acrylate, tridecyl(meth)acrylate, tetradecyl (meth)acrylate, hexadecyl(meth)acrylate, octadecyl(meth) acrylate, stearyl(meth)acrylate, dicyclopentenyloxymethyl (meth)acrylate, benzyl(meth)acrylate, 2-phenoxyethyl (meth)acrylate, 3,3,5-trimethyl-cyclohexyl(meth)acrylate, 3-methylphenyl(meth)acrylate, 1-naphtyl(meth)acrylate, 3-phenyl-n-propyl(meth)acrylate and 2 phenyl-aminoethyl (meth)acrylate. Suitable substituted (meth)acrylamide functional monomers include e.g. alkyl(meth)acrylamide monomers such as t-octyl(meth)acrylamide and n-decyl(meth) acrylamide. Further examples of suitable monomers for introducing the first monomeric units to the random copolymer include vinyl monomers such as vinyl toluene, vinyl alkyl halide, styrene, vinyl pyridine, alpha methyl styrene dimer, vinyl esters of versatic acid such as VEOVA® 9 or VEOVA® 10, vinyl halide, and vinylidene chloride, and mixtures thereof. The first monomeric units in the copolymer (a) can be derived from one or more than one monomer selected from alkyl(meth)acrylates, cycloalkyl(meth)acrylates, alkylcyclo(meth)acrylates, aralkyl(meth)acrylates, alkylaryl(meth)acrylates and aryl(meth)acrylates.

The second monomeric units of the random copolymer (a) comprise one or more than one active hydrogen-containing functional group. The term "active hydrogen group-containing functional group" means a functional group that contains one or more than one hydrogen atom, which is able to participate under dissociation of the original bond to the hydrogen atom in a chemical reaction. The second monomeric units are included in the copolymer to provide for reactivity with groups present in the first or second component of reactive mixture (b)(ii) such as isocyanate groups or epoxy groups and/or to provide desired properties such as enhanced adhesion to a polymeric substrate to the resinous adhesion promoter and/or coating compositions produced therefrom. For example the one or more than one active hydrogen group-containing functional group can be selected from hydroxyl, amino, carboxy or thiol. The second monomeric units can be derived from respective ethylenically unsaturated monomers used in the preparation of the copolymer. Thus, the first monomeric units can be derived from one or more than one ethylenically unsaturated monomer having one or more than one active hydrogen group-containing functional group such as hydroxyl, amino, carboxy and/or thiol group. For example, the second monomeric units may be derived from hydroxyl functional ethylenically unsaturated monomers and/or ethylenically unsaturated acids. As used herein, "ethylenically unsaturated" refers to a group having at least one carbon-carbon double bond.

Suitable hydroxyl functional monomers that can be used for introducing the second units of the random copolymer that are reactive with functional groups of the first or second component include for example hydroxyl functional (meth)

acrylic acid alkyl esters such as 2-hydroxyethyl(meth)acrylate, 2-hydroxypropyl(meth)acrylate, 3-hydroxypropyl (meth)acrylate, 4-hydroxybutyl(meth)acrylate, or an adduct of (meth)acrylic acid/glycidyl neodecanoate. In addition, other suitable hydroxyl containing monomers that may be used include ethylene glycol allyl ether, propylene glycol allyl ether, butylene glycol allyl ether, diethylene glycol allyl ether, cyclomethylol propene allyl ether and hydroxymethylnorbornene, allyl alcohol, methyl allyl alcohol, and unsaturated fatty alcohols. Non-limiting ethylenically unsaturated acids that can be used as monomers for introducing second monomeric units to the random copolymer according to the present invention include e.g. (alkyl)acrylic acids such as acrylic acid or methacrylic acid, or maleic acid. The second monomeric units may in particular be derived from hydroxyl functional (meth)acrylic acid alkyl esters and/or methacrylic acid. Other monomers from which the second monomeric units in the random copolymer may be derived include amine functional monomers. Suitable amine functional monomers for introducing the second monomeric units of the random copolymer include e.g. polyamines having at least two functional groups such as di-, tri-, or higher functional polyamines, which may be aromatic and/ or aliphatic.

The random copolymer of the present invention may optionally include further monomeric units, which are different from the first and second monomeric units. Such further monomeric units may for example be included to manipulate the copolymer polarity for better resin stability and miscibility with the next layer of coating. Such further monomeric units thus include those derived from ethylenically unsaturated monomers with relatively short organic substituents having less than six carbon atoms, which do not contain active-hydrogen-containing functional groups or halogen substituents. Non-limiting examples of monomers, which can be used in the preparation of the random copolymer (a) to introduce such further monomeric units include alkyl(meth)acrylates, wherein the alkyl group has one to five carbon atoms, such as methyl(meth)acrylate.

The first monomeric units of the random copolymer having a halogen substituent or a pendant organic group with six or more carbon atoms may be present in the random copolymer in an amount of at least 20 wt. % such as at least 30 wt. % or at least 50 wt. % or at least 75 wt. % and may be present in an amount of up to 95 wt. %, such as up to 90 wt. % or up to 85 wt. % or to up to 80 wt. %, based on the total solids weight of the random copolymer. The second monomeric units of the random copolymer having active hydrogen-containing functional groups reactive with groups present in the first or second component of reactive mixture (b)(ii) may be present in the random copolymer in an amount of at least 5 wt. % such as at least 10 wt. % or at least 15 wt. % or at least 20 wt. % or at least 30 wt. % or at least 40 wt. % or at least 50 wt. % and may be present in an amount of up to 90 wt. % or up to 80 wt. % or up to 50 wt. % or up to 40 wt. % or up to 30 wt. % or up to 20 wt. % or up to 15 wt. %. The optional further monomeric units of the random copolymer may be present in the random copolymer in an amount of at least 5 wt. % such as at least 10 wt. % or at least 15 wt. % or at least 20 wt. % or at least 30 wt. % or at least 40 wt. % or at least 50 wt. % and may be present in an amount of up to 90 wt. % or up to 70 wt. % or up to 50 wt. % or up to 40 wt. % or up to 30 wt. % or up to 20 wt. % or up to 15 wt. %. It should be understood that the sum of the amounts of the first, second, and optional further monomeric units always totals 100%.

The random copolymer may be produced by copolymerizing monomers from which the first, second and optionally further monomeric units can be derived, respectively, e.g. using conventional radical polymerization or any living polymerization techniques, including but not limited to cationic polymerization, anionic polymerization, cobalt mediated polymerization, iodine mediated polymerization, group transfer polymerization, reverse addition-fragmentation chain transfer (RAFT) polymerization, atom transfer radical polymerization (ATRP) or nitroxide mediated polymerization (NMP) techniques. It is to be understood that the monomers of the random copolymer may be added in any order (sequence) or all at once and that the relative amounts of the first, second, and optional further monomeric units can be adjusted by controlling the amounts of the different monomers.

Random Copolymer (a) with Another Adhesion Promoter (b)(i)

A coating composition according to the present invention can comprise the above-described random copolymer of the present invention (a) as a non-reactive adhesion promoting component of the coating composition and further contain another non-reactive adhesion promoter (b)(i). Typically the non-reactive adhesion promoting component (b)(i) is a polyolefin or chemically modified polyolefin such as a halogenated polyolefin. The polyolefins or modified polyolefins can, for example, be homopolymers produced from ethylene, propylene or higher alkylenes or copolymers from two or more such monomers. Suitable components for non-reactive adhesion promoter (b)(i) include chlorinated polyolefins (CPOs), such as those available commercially from Nippon Paper Chemicals under the trade designations SUPERCHLON E-723, E-673, and/or E-503. Alternative components for non-reactive adhesion promoter (b)(i) include non-chlorinated polyolefins, such as those commercially available from Eastman under the trade name ADVANTIS 510W and/or those available commercially from Nippon Paper Chemicals under the trade names AUROREN AE 201 and/or AE-301.

As used herein, a "non-reactive component" is a component of a composition that does not react with other components of the composition. Likewise, "a non-reactive adhesion promoter" is a component of a composition that does not react with other components of the composition and which promotes adhesion of the composition or a coating layer formed therefrom to a substrate, e.g. a polyolefin-based substrate, such as the random copolymer adhesion promoting additive described herein. As such, the present invention also includes a coating composition comprising a film-forming polymer, the random copolymer of the present invention, and another adhesion promoter (e.g. CPO), wherein the random copolymer does not react with the film-forming polymer or the other adhesion promoter (b)(i). The random copolymer adhesion promoter composition has monomeric units comprising halogen and/or a pendant organic group having six or more carbon atoms such as those described above that promote adhesion to a polymeric substrate.

The random copolymer and the other adhesion promoter (e.g., CPO), if used, may be provided as separate additions to a coating composition or together as a pre-mixture or as a composite material. By "composite material", it is meant to include a structure wherein the random copolymer of the present invention at least partially encapsulates the adhesion promoter additive. As used herein, the term "encapsulated" refers to a feature of particles of the other adhesion promoter that are at least partially enclosed by (i.e. covered by) the random copolymer to an extent sufficient to physically separate particles of the other adhesion promoter from each other within a dispersion, which may be aqueous or solvent based, thereby preventing agglomeration of the other adhesion promoter. It will be appreciated that dispersions of the composite material of the present invention may also include an adhesion promoter that is not encapsulated within the random copolymer. Encapsulation, or at least partial encapsulation, of the other adhesion promoter in the random copolymer of the present invention may be accomplished by adding the other adhesion promoter into a random copolymer solution with solvent(s) in which the other adhesion promoter may not be dissolved in at room temperature.

By "film-forming polymer" it is meant a polymer that can form a self-supporting continuous film on at least a horizontal surface of a substrate upon removal of any diluents or carriers in the composition or upon curing at ambient or elevated temperatures.

The film-forming polymer may comprise a thermoplastic polymer and/or thermosetting polymer. The one or more than one film-forming polymer may be waterborne or solvent-based.

As used herein, the term "thermosetting" refers to polymeric materials that "set" irreversibly upon curing or crosslinking, wherein the polymer chains of the constituent polymer molecules are joined together by covalent bonds. This property is usually associated with a crosslinking reaction of the polymer often induced, for example, by heat or radiation. Curing or crosslinking reactions also may be carried out under ambient conditions. Once cured or crosslinked, a thermosetting resin will not melt upon the application of heat and is insoluble in solvents. Suitable thermosetting film-forming polymers include, for example, acrylic polymers, polyvinyl polymers, phenolics, polyester polymers, polyurethane polymers, polyamide polymers, polyether polymers, polysiloxane polymers, copolymers thereof, and mixtures thereof.

As used herein, the term "thermoplastic" refers to polymeric materials, wherein the constituent polymer molecules are joined by non-covalent intermolecular forces and thereby can undergo a reversible transition from solid to liquid or flowable state upon heating and be soluble in solvents. Suitable thermoplastic film-forming polymers include, but are not limited to, thermoplastic acrylic polymers, thermoplastic polyolefins, such as polyethylene or polypropylene, thermoplastic polyamides, such as nylon, thermoplastic polyurethanes, thermoplastic polyesters, thermoplastic vinyl polymers, polycarbonates, acrylonitrile-butadiene-styrene ("ABS") copolymers, ethylene propylene diene terpolymer ("EPDM") rubber, copolymers, and mixtures of any of the foregoing. Generally these polymers can be any polymers of these types made by any method known to those skilled in the art. Such polymers may be solvent borne or water dispersible, emulsifiable, or of limited water solubility.

The film-forming polymer may be any film-forming polymer as used in conventional primer compositions and/or a basecoat compositions. By "primer composition" (also referred to as a "sealer") it is meant a coating composition designed to adhere to substrates and form a binding layer between the substrate and an overlying coating, such as a layer formed from a basecoat composition. By "basecoat composition" it is meant a coating composition that typically is applied over a coating formed from a primer composition and may include components (such as pigments and/or flake material) that impact the color and/or visual effects of the basecoat composition and coating formed therefrom.

The concentration of random copolymer included as component (a) in the coating compositions according to the present invention may be up to 40 wt. % or up to 30 wt. % or up to 20 wt. %, based on total solids weight of the coating composition. The random copolymer may be used as component (a) in a concentration of at least 1 wt. % or at least 2 wt. % or at least 3 wt. % or at least 4 wt. % or at least 5 wt. % or at least 10 wt. % or at least 20 wt. %, based on total solids weight of the coating composition. The random copolymer as described herein above may be used as an adhesion promoting component in a concentration of 1 to 50 wt. % or 5 to 30 wt. % based on the total solids weight of the coating composition.

The concentration of the other adhesion promoter (b)(i) (e.g. polyolefin or chemically modified polyolefin such as CPO) in a coating composition of the present invention may be up to 15 wt. % or up to 12 wt. % or up to 10 wt. % or up to 5 wt. % or up to 1 wt. % based on the total solids weight of the coating composition. The other adhesion promoter may be present in a concentration of at least 0.5 wt. % or at least 1 wt. % or at least 5 wt. %, based on the total solids weight of the coating composition. The other adhesion promoter as described herein above may for example be used in a concentration of 0.5 to 15 wt. % or 1 to 5 wt. % based on the total solids weight of the coating composition.

The coating composition of the present invention including the random copolymer as an adhesion promoting component exhibits enhanced adhesion to a polymeric substrate, in particular a polyolefin-based substrate, compared to a coating composition not including the random copolymer adhesion promoter component. The coating composition including the random copolymer as a non-reactive adhesion promoter component is suitable for use as a primer composition applied directly to a substrate (which may or may not be pre-cleaned) and promoting adhesion thereto.

A polymeric substrate may be treated by first cleaning at least a portion of the polymeric substrate as described below. The resinous adhesion promoter composition comprising the random copolymer and another adhesion promoter, such as a polyolefin (e.g. CPO) may be applied directly to a cleaned polymeric substrate or an untreated polymeric substrate. By "untreated", it is meant that the substrate has not been pre-cleaned with a detergent, solvent, or CPO or the like. In this manner, the conventional steps of multiple CPO wipes may be avoided.

Random Copolymer (a) with Two Component Reaction Mixture (b)(ii)

The random copolymer of the present invention is also suitable as a reactant of a resinous binder for use as a primer composition applied directly to a polymeric substrate and promoting adhesion thereto. A resinous adhesion promoter composition including the random copolymer (a) and reactive mixture (b)(ii) without any non-reactive adhesion promoter (such as a polyolefin, e.g. CPO) can be deposited onto a polymeric substrate by any conventional method including brushing, dipping, flow coating, spraying and allowed to cure at ambient conditions or at elevated temperature, as needed for curing the coating composition.

The first component and second component of reaction mixture (b)(ii) may be components of a coating composition that is produced from two components that react when contacted with each other either in ambient conditions or at elevated temperature, such as a polyol and an isocyanate of a polyurethane coating composition. At least one of the first and second components of the reactive mixture (b)(ii) comprises functional groups, which are reactive with the active-hydrogen-containing groups of the second monomeric units of the random copolymer, which can be any active-hydrogen-containing groups as described above, under ambient conditions or at elevated temperature. The functional groups reactive with the active-hydrogen-containing groups of the random copolymer can for example be selected from epoxy, anhydride, isocyanate groups or mixtures and combinations thereof. It should be appreciated that the present invention is not limited to a specific two-component coating chemistry. For example, the first component may include hydroxyl functional moieties and the second component may include isocyanate functional moieties. Other reactive functionalities are also within the scope of the invention; for example, the first component may include a polyamine or a polyacid, and the second component may include a species reactive with the functionality on the first component, such as an epoxy, melamine, anhydride, alkoxysilane, and the like. When the first component includes acid functional moieties, the second component may include carbodiimide functionality. Likewise, both the first and second components may each have silane functionalities or thiol functionalities.

The concentration of random copolymer included as a reactant of a resinous binder for use as a primer composition may be up to 40 wt. % or up to 30 wt. % or up to 20 wt. %. The random copolymer may be used as a reactant in a concentration of at least 1 wt. % or at least 2 wt. % or at least 3 wt. % or at least 4 wt. % or at least 5 wt. % or at least 10 wt. % or at least 20 wt. %. The random copolymer as described herein above may be used as a reactant in a concentration of 1 to 40 wt. % or 5 to 30 wt. % based on the total solids in the coating composition.

Substrates

The present invention is further directed to treating a polymeric substrate comprising applying to at least a portion of the substrate a coating composition as described above. Particularly suitable polymeric substrates for use with the coating compositions of the present invention include plastic substrates. As used herein, the term "plastic" includes any thermoplastic or thermosetting polymeric material used in injection or reaction molding, sheet molding, or other forming process whereby parts can be formed. The term "polymeric substrate" as used herein means a substrate that is made of one or more than one polymeric material, which may optionally comprise additives such as fillers. Suitable polymeric materials for the polymeric substrate include, for example, acrylonitrile butadiene styrene ("ABS"), polyolefins, polycarbonate, thermoplastic elastomer, polyester, thermoset polyurethane, thermoplastic polyurethane, and fiberglass reinforced polyester, among others. Common examples of polyolefins are polypropylene (PP), polyethylene, and polybutylene and include the class of thermoplastic polyolefin ("TPO"). TPO generally refers to polymer/filler blends usually including some fraction of PP (polypropylene), PE (polyethylene), BCPP (block copolymer polypropylene), rubber, and a reinforcing filler. Common fillers include, though not restricted thereto, talc, fiberglass, carbon fiber, wollastonite, and MOS (metal oxy sulfate). Common rubbers include EPR (ethylene propylene rubber), EPDM (EP-diene rubber), EO (ethylene-octene), EB (ethylene butane rubber), and SEBS (styrene-ethylene-butadiene-styrene). The present invention is particularly useful for polyolefin-based substrates such as polyolefin substrates and thermoplastic polyolefin substrates.

The substrate may be pre-cleaned prior to deposition of the coating composition. The cleaning step refers to the removal of unwanted foreign matter from the surface, such as soil, dirt, cutting oils, waxes, finger oils, and sanding dust, among other things. The substrate may be cleaned by, for example, mechanically separating the unwanted matter from the substrate contacting the substrate with a cleaning composition, or a combination thereof. The cleaning composition can comprise a solvent, which is capable of dissolving the unwanted foreign matter, such as for example water and/or one or more organic solvent such as a hydrocarbon mixture, mineral spirits or the like. The cleaning composition can comprise one or more than one detergent. As used herein, the term "detergent" refers to a substance that reduces the surface tension of water, i.e., a surface-active agent or a surfactant, which concentrates at oil-water interfaces, exerts emulsifying action, and aids in removing contaminants from a surface. Detergents that might be used in the practice of the present invention include anionic, nonionic, amphoteric and cationic surfactants used in conventional cleaning compositions. For example, the detergent may include d-limonene, an oil extracted from citrus rind. The detergent may be provided in a cleaning composition, in which the detergent may, for example, comprise 0.01 to 10.0 percent by weight, or 0.1 to 0.5 percent by weight, or 0.1 to 0.3 percent by weight of the cleaning composition based on the total weight thereof. The amount of detergent present in the cleaning composition can range between any combination of the recited values, inclusive of the recited values. Cleaning compositions that are particularly useful in the practice of the present invention can include a fatty acid ester, such as a soy-based fatty acid ester. Pre-cleaning with such cleaning compositions has been found to improve the adhesion of coatings such as coatings formed from the coating compositions according to the present invention to polymeric substrates.

Cleaning of the substrate may include contacting the substrate with an object, such as a pad or sponge, having a cleaning composition as described above in contact with or absorbed therein. The step of cleaning the substrate may include contacting the substrate with an abrasive material having the cleaning composition contained therein. Abrasive materials suitable for use in the methods and systems of the present invention are commercially available and include, for example, SCOTCH-BRITE™ Scuff Sponges, commercially available from 3M Company, St. Paul, Minn., and BEAR-TEX® Scuff Pads and Sponges, commercially available from Norton Abrasives.

In contrast to conventional practice, the coating compositions of the present invention having the random copolymer may be applied directly to the cleaned substrate, with no other pre-treatment of the substrate, other than the aforedescribed optional cleaning thereof. In this manner, conventional pre-treatment steps of wiping the substrate one or more times with a solvent and/or treatment of the substrate with a composition containing CPO can be avoided. According to the present invention, a polymeric substrate may be treated by cleaning at least a portion of the substrate and applying the composition of the present invention having the random copolymer directly on to the cleaned portion of the substrate.

The coating compositions of the present invention may be used as a primer composition and/or a basecoat composition in a multi-layered coating system. As such, further coating compositions may be applied to, e.g. over, the coating composition of the present invention or a coating layer formed therefrom. Examples of such further coating compositions include protective and/or decorative coating systems, such as basecoat compositions and/or clearcoat compositions and/or colored coating compositions, as described below.

Protective and/or decorative coating systems that may be used in the present invention include, for example, those protective and/or decorative coating systems that are conventionally used in automotive refinish coating applications and automotive OEM applications, among others. Examples of suitable protective and/or decorative coating systems include single-layer coating systems, such as pigmented direct gloss coating systems, and multi-layered systems, such as systems that include a pigmented basecoat layer and a clear top coating layer. One or more layers of the protective and/or decorative coating system may be deposited from a coating composition that includes a polymeric composition that includes, without limitation, hydroxyl or carboxylic acid-containing acrylic copolymers, hydroxyl or carboxylic acid-containing polyester polymers and oligomers, isocyanate or hydroxyl-containing polyurethane polymers, and/or amine or isocyanate-containing polyureas. The one or more layers of the protective and/or decorative coating system may be deposited from a coating composition that includes one or more other additive ingredients, including those which are well known in the art of formulating surface coatings, such as dyes, pigments, surfactants, flow control agents, thixotropic agents, fillers, anti-gassing agents, organic co-solvents, catalysts, and other customary auxiliaries.

The coating compositions of the present invention may be used in refinishing of plastic articles. As used herein, the term "refinishing" refers to the act of restoring or repairing the surface or finish of an article or, in the case of automobile repairs, for example, the preparation of the surface or finish of an uncoated replacement article in connection with such a repair.

The coating compositions of the present invention can be applied to any substrates known in the art, for example, automotive substrates, marine substrates, industrial substrates, heavy duty equipment, packaging substrates, lumber, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. The coating compositions of the present invention are particularly suited for use with polymeric substrates, which include plastic, polyester, polyolefin, polyamide, cellulosic, polystyrene, polyacrylic, poly(ethylene naphthalate), polypropylene, polyethylene, nylon, ethylene vinyl alcohol ("EVOH"), polylactic acid, other "green" polymeric substrates, poly(ethyleneterephthalate) ("PET"), polycarbonate, polycarbonate acrylobutadiene styrene ("PC/ABS"), and polyamide. The coating compositions of the present invention may also be used with metallic substrates including tin, steel, tin-plated steel, chromium passivated steel, galvanized steel, aluminum, and aluminum foil. Metal sheet as used herein refers to flat metal sheet and coiled metal sheet, which is coiled, uncoiled for coating and then re-coiled for shipment to a manufacturer. Likewise, the coating compositions of the present invention may be applied to non-metallic substrates such as wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect. Suitable substrates can include those in which powder coatings are typically applied.

Illustrating the invention are the following examples that are not to be considered as limiting the invention to their details. All parts and percentages in the examples, as well as throughout the specification, are by weight unless otherwise indicated.

EXAMPLES

Test Methods

The coatings produced in the Examples herein were tested for adhesion to a polymeric substrate in a cross hatch adhesion test and a 90 degree peel resistance test.

The cross hatch adhesion test was performed using a template to cut at least 11 parallel lines spaced apart 2 mm both horizontally and vertically to create a grid of 100 squares that was placed upon the applied cured coating. First, with a retractable knife perpendicular to the panel surface, 11 parallel lines were cut through to the substrate surface using a 2 mm spacing template (cutting guide available from Taizu Kazai Co., Japan). The template was repositioned to make additional cuts at 90 degrees to the first set and cut as described above to create a grid of 100 squares. The film was lightly brushed with a soft brush or tissue to remove any detached flakes or ribbons of coatings. A 75 mm (3 inch) long piece of tape (SCOTCH® Filament Tape 898 available from 3M, Maplewood, Minn. or equivalent) was placed over the scribed lines in the same direction as one set of the lines. The taped was smoothed firmly over the substrate with an eraser or the backside of the blade-holder handle. The tape was then pulled off in one rapid, continuous motion while keeping the tape as close as possible to a 45 degree angle to the surface. The result was reported as the percentage adhesion, i.e. percentage of the cut squares remaining on the test panel, e.g., no removal is recorded as 100 percent adhesion.

The 90 degree peel resistance test was performed when the coatings were subjected to 7 days of room temperature curing. A 1.5 inch wide area on the topcoat of the substrate was sanded with a 3M 320 grit sandpaper, followed by cleaning with DXA330, a wax and grease remover available from PPG Industries, Inc., Pittsburgh, Pa. A 75 mm (3 inch) long piece of tape (3M tape 898 or equivalent) was placed over the sanded area in the same direction as the longer substrate edge. The tape was smoothed firmly over the substrate with an eraser or the backside of the blade-holder handle. After 24 hours, the tape was pulled using an Instron Mini 44 (Norwood, Mass.). The substrate was placed on the stage of the Instron Mini 44 with the tape mounted on the 50 N load cell. The pulling rate was 50 mm/min and the pulling distance is 1 to 2 inches. The following test conditions were used on an Instron Mini 44 peel test machine with the average load value reported in N/mm:

Load Cell: 50 N
Temperature/Humidity: 76/26%
Crosshead Speed: 50 mm/min
Pull tape wide: 0.5-0.7 inch
Peel length: 1-2 inch
Pull force: 2 inches/min Substrates Plastic substrates of polypropylene (PP) and thermoplastic olefin (TPO) were used in the evaluation. The polypropylene substrates were Lyondell Basell Profax SB891 NAT, available from Standard Plaque Inc., Melvindale, Mich. The TPO substrates were from Lyondell Basell Hifax TRC 779X, also available from Standard Plaque Inc.

Pre-Cleaning

Unless otherwise noted, the substrates were wipe-cleaned with an aliphatic hydrocarbon solvent mixture, flashed for 5 seconds, and wipe-dried with a piece of cheese cloth, prior to the application of the coating layer. The aliphatic hydrocarbon mixture included, but was not limited to VM&P Nathptha (available from W. M. Barr, Memphis, Tenn.), mineral spirits or the like. It may also contain a small percentage of isopropanol and Larostat 264A, available from BASP (Florhan Park, N.J.).

Examples 1-8: Synthesis of Random Copolymers

Random copolymers were prepared using the materials listed in Table 1. For each of Examples 1-8 (Examples 2, 4, and 6 being comparative), charge 1 was added into a 2 L four-necked glass flask equipped with a condenser, a temperature measuring probe, mechanical stirring devices, and monomer/initiator feeding inlets. The setup was protected with nitrogen gas during the entire reaction. The mixture was heated to reflux at 125° C., and at reflux, charge 2 and charge 3 were co-fed over 4 hours. After the feeds were completed, the reaction mixture was held for an additional 1 hour. At the end of the hold, charge 4 was added over 30 minutes. Finally, the reaction was ended by adding charge 5 into the mixture. The final solids were experimentally measured at 49.3%, the number averaged molecular weight ($M_n$) and the polydispersity index (Đ) were 2800 g/mol and 2.3 respectively (measured by gel permeation chromatography using polystyrene standards).

Table 2 shows the final composition by weight percent (%) of the constitutional monomeric units derived from the different monomers, $M_n$, and Đ for the random copolymers of Examples 1-8, determined as in Example 1.

TABLE 1

| | Example | | | | | | | |
|---|---|---|---|---|---|---|---|---|
| | 1 | Comp. 2 | 3 | Comp. 4 | 5 | Comp. 6 | 7 | 8 |
| | Components (parts by wt.) | | | | | | | |
| Charge 1 | | | | | | | | |
| Dowanol PM[1] | 104.8 | 104.8 | 104.8 | 104.8 | 104.8 | 104.8 | 104.8 | 104.8 |
| OXSOL ® 100[2] | 400.0 | 400.0 | 400.0 | 400.0 | 400.0 | 400.0 | 400.0 | 400.0 |
| Charge 2 | | | | | | | | |
| Luperox 270[3] | 38.8 | 38.8 | 38.8 | 38.8 | 38.8 | 38.8 | 38.8 | 38.8 |
| OXSOL ® 100 | 77.4 | 77.4 | 77.4 | 77.4 | 77.4 | 77.4 | 77.4 | 77.4 |
| Charge 3 | | | | | | | | |
| 2-hydroxyethyl acrylate (HEA) | 106.7 | 0.0 | 106.7 | 106.7 | 0.0 | 0.0 | 53.4 | 53.4 |
| Glacial acrylic acid (AA) | 0.0 | 106.7 | 106.7 | 0.0 | 106.7 | 0.0 | 53.4 | 53.4 |
| Isobornyl acrylate (IBoA) | 756.7 | 0.0 | 756.7 | 0.0 | 756.7 | 756.7 | 378.3 | 863.3 |
| Methyl methacrylate (MMA) | 106.7 | 863.4 | 0.0 | 863.4 | 106.7 | 213.4 | 485.1 | 0.0 |

TABLE 1-continued

| | Example | | | | | | | |
|---|---|---|---|---|---|---|---|---|
| | 1 | Comp. 2 | 3 | Comp. 4 | 5 | Comp. 6 | 7 | 8 |
| | Components (parts by wt.) | | | | | | | |
| Charge 4 | | | | | | | | |
| Luperox 270 | 9.7 | 9.7 | 9.7 | 9.7 | 9.7 | 9.7 | 9.7 | 9.7 |
| OXSOL ® 100 | 38.8 | 38.8 | 38.8 | 38.8 | 38.8 | 38.8 | 38.8 | 38.8 |
| Charge 5 | | | | | | | | |
| OXSOL ® 100 | 388.1 | 388.1 | 388.1 | 388.1 | 388.1 | 388.1 | 388.1 | 388.1 |
| Theoretical % solids | 50.2% | 50.2% | 50.2% | 50.2% | 50.2% | 50.2% | 50.2% | 50.2% |
| Actual % solids | 49.30% | 49.60% | 50.20% | 49.30% | 50.50% | 50.50% | 50.60% | 49.50% |

[1]Solvent, propylene glycol monomethyl ether, available from Dow Chemical Co.
[2]Solvent, 4-chlorobenzotrifluoride, available from Jiangsu Dahua Chemical Industry
[3]Initiator, tert-butyl peroxy-3,5,5-trimethylhexanoate, available from ARKEMA INC

TABLE 2

| Example | HEA | AA | IBoA | MMA | $M_n$ (g/mol) | Đ |
|---|---|---|---|---|---|---|
| 1 | 11% | 0% | 78% | 11% | 2800 | 2.3 |
| 2 (Comp.) | 0% | 11% | 0% | 89% | 5100 | 2.5 |
| 3 | 11% | 11% | 78% | 0% | 2700 | 2.6 |
| 4 (Comp.) | 11% | 0% | 0% | 89% | 5300 | 3 |
| 5 | 0% | 11% | 78% | 11% | 2700 | 2.4 |
| 6 (Comp.) | 0% | 0% | 78% | 22% | 2600 | 2.4 |
| 7 | 5.5% | 5.5% | 39% | 50% | 3900 | 3.1 |
| 8 | 5.5% | 5.5% | 89% | 0% | 2300 | 2 |

Examples 9-16: Solvent Borne 2K Primer Composition with Copolymers of Examples 1-8

Polymeric substrates were pre-cleaned as described above. The random copolymers of Examples 1-8 were first diluted to 8.86% solids by weight using OXSOL 100 solvent. A two-component isocyanate based primer composition was each prepared by blending 112.9 parts of the diluted solution of one of the copolymers from Examples 1-8 (10 parts resin solids in 102.9 parts of OXSOL 100), and 313.3 parts of ECS25 primer, commercially available from PPG Industries, Inc. The mixture was then blended with 78.8 parts of EH391 hardener, also commercially available from PPG Industries, Inc. The formulated primer was applied as two coats on the pre-cleaned polymeric substrates, with a few minutes flash between coats. The primer was cured at ambient temperature for 60 minutes. Then, each substrate was coated with a basecoat T409 Envirobase Black and a clearcoat (DC4000/DCH3085), both available from PPG Industries, Inc., subsequently with a flash time of 30 minutes between coats. After 7 days ambient cure, a cross hatch adhesion test and a 90 degree peel resistance test were performed as described above. The test results are reported in Table 3.

TABLE 3

| | | TPO Substrate | | PP Substrate | |
|---|---|---|---|---|---|
| Example | Random copolymer | Cross-Hatch adhesion (%) | 90 peel strength (N/mm) | Cross-Hatch adhesion (%) | 90 peel strength (N/mm) |
| 9 | Ex. 1 | 100 | 0.19 | 6 | 0.119 |
| 10 (Comp.) | Ex. 2 | 27.5 | 0.075 | 1 | 0.079 |
| 11 | Ex. 3 | 100 | 0.165 | 9 | 0.1 |
| 12 (Comp.) | Ex. 4 | 2.5 | 0.044 | 3 | 0.05 |
| 13 | Ex. 5 | 98.5 | 0.174 | 0 | 0.074 |
| 14 (Comp.) | Ex. 6 | 10 | 0.096 | 0 | 0.055 |
| 15 | Ex. 7 | 68 | 0.096 | 16 | 0.096 |
| 16 | Ex. 8 | 100 | 0.18 | 9 | 0.123 |

Improved adhesion on the polymeric substrates was found for a 2K primer composition incorporating a random copolymer of the present invention (Examples 9, 11, 13, 15 and 16) including first monomeric units with a pendant long chain hydrocarbon group (monomeric units derived from IboA) and second monomeric units that comprise active hydrogen-containing functional groups monomeric units derived from HEA and/or AA) compared to the primer compositions of Comparative Examples 10, 12 and 14, which included random copolymers not according to the present invention.

Examples 17-24: 1K Coating Composition with CPO

The random copolymers of Examples 1-8 were each blended with chlorinated polyolefin (CPO) using the materials listed in Table 4. Charge 1 was added into a 1 L four-necked glass flask equipped with a condenser, a temperature measuring probe, and mechanical stirring devices and heated to 90° C., and, at 90° C., charge 2 was added into the flask. The mixture was held at 90° C. until the SUPERCHLON® 930S was completely dissolved. Charge 3 was then added into the flask, and the mixture was held at 90° C. for an additional 3 hours. After the hold, the mixture was cooled to 40° C., and charge 4 was added into the flask and mix for an additional 30 minutes.

TABLE 4

| | Example | | | | | | | |
|---|---|---|---|---|---|---|---|---|
| | 17 | 18 | 19 | 20 | 21 | 22 | 23 | 24 |
| Components (parts by wt.) | | | | | | | | |
| Charge 1 | | | | | | | | |
| OXSOL 100 | 250.7 | 252.8 | 257.1 | 250.7 | 259.2 | 259.2 | 259.9 | 252.1 |
| Charge 2 | | | | | | | | |
| SUPERCHLON 930S[4] | 49.3 | 49.6 | 50.2 | 49.3 | 50.5 | 50.5 | 50.6 | 49.5 |
| Charge 3 | | | | | | | | |
| Butanol | 1.86 | 1.87 | 1.90 | 1.86 | 1.91 | 1.91 | 1.91 | 1.87 |
| Charge 4 | | | | | | | | |
| Random copolymer | | | | | | | | |
| | Ex. 1 | Ex. 2 | Ex. 3 | Ex. 4 | Ex. 5 | Ex. 6 | Ex. 7 | Ex. 8 |
| | 100.0 | 100.0 | 100.0 | 100.0 | 100.0 | 100.0 | 100.0 | 100.0 |
| Weight ratio adhesion promoter solids:CPO | 50:50 | 50:50 | 50:50 | 50:50 | 50:50 | 50:50 | 50:50 | 50:50 |
| Theoretical % solids | 25.0 | 25.0 | 25.0 | 25.0 | 25.0 | 25.0 | 25.0 | 25.0 |
| Actual % solids | 25.0 | 24.6 | 25.2 | 25.5 | 25.2 | 25.4 | 24.8 | 24.8 |

[4]Chlorinated polyolefin containing 5 wt. % monomeric units derived from maleic anhydride available from Nippon Paper Industries Examples 25-39: Use of Coating Compositions Including Copolymers of Examples 1-8 with or without CPO Additive, for the Preparation of Multilayer Coatings The polymeric substrates were pre-cleaned using the pre-cleaning method described above. The random copolymers of Examples 1-8 without CPO and the same copolymers blended with CPO (Examples 17-24) were each diluted to 8.86% solid by weight using OXSOL 100 solvent. Example 2 did not yield a homogenous composition and was not further evaluated. The diluted resin solutions were then directly applied to the pre-cleaned substrates (TPO and polypropylene (PP)) and flashed for 30 minutes at room temperature. A two-component isocyanate based primer composition was prepared by blending 367.5 parts of ECS25 primer, with 77.3 parts of EH391 and 82.6 parts OXSOL 100 solvent. The formulated primer was applied directly on the top of the substrates coated with the random copolymer or blend thereof with CPO. The primer was cured at ambient temperature for 30 minutes. Subsequently, the coated substrate was further coated with a basecoat T409 Envirobase Black and a clearcoat (DC4000/DCH3085) with a flash time of 30 minutes between coats. After 7 days ambient cure, a cross hatch adhesion test and a 90 degree peel resistance of adhesives test were performed as described above. The test results are reported in Table 5. The results showed that combining CPO with a resin comprising the random copolymer of the present invention improves the adhesion performance on polypropylene as well as TPO substrate. Use of copolymers not according to the present invention (Comparative Examples 2, 4 and 6) yielded significantly worse adhesion performance.

TABLE 5

| | | | Cross-hatch adhesion (%) | 90 peel strength (N/mm) | Cross-hatch adhesion (%) | 90 peel strength (N/mm) |
|---|---|---|---|---|---|---|
| | Random | Blend with CPO | Substrate | | | |
| Example | copolymer | (Y/N) | TPO | | Polypropylene | |
| 25 | Ex. 1 | N | 100 | 0.15 | 6 | 0.114 |
| 26 | Ex. 1 | Y (Ex. 17) | 100 | 0.439 | 76 | 0.157 |
| 27 | Ex. 3 | N | 93 | 0.142 | 49 | 0.125 |
| 28 | Ex. 3 | Y (Ex. 19) | 100 | 0.513 | 100 | 0.191 |
| 29 | Ex. 4 | N | 87 | 0.128 | 2 | 0.095 |
| 30 | Ex. 4 | Y (Ex. 20) | 100 | 0.376 | 100 | 0.333 |
| 31 | Ex. 5 | N | 100 | 0.141 | 50 | 0.115 |
| 32 | Ex. 5 | Y (Ex. 21) | 100 | 0.349 | 100 | 0.240 |
| 33 | Ex. 6 | N | 0 | 0.012 | 0 | 0.015 |
| 34 | Ex. 6 | Y (Ex. 22) | 100 | 0.299 | 70 | 0.081 |
| 35 | Ex. 7 | N | 99 | 0.119 | 51 | 0.106 |
| 36 | Ex. 7 | Y (Ex. 23) | 100 | 0.382 | 100 | 0.239 |
| 37 | Ex. 8 | N | 100 | 0.306 | 3 | 0.112 |
| 38 | Ex. 8 | Y (Ex. 24) | 100 | 0.462 | 100 | 0.169 |

Example 39-43: Impact of Cleaning Composition on Coating Adhesion to Substrate

Additionally the impact of using different cleaning compositions for substrate pre-treatment on adhesion performance were evaluated. For this purpose, PP and TPO polymeric substrates were sprayed with a solvent or solvent blend as listed in Table 6, then wiped dry with a piece of cheese cloth after 5 seconds. A CPO-based adhesion promoter (SU 470 LV, available from PPG Industries, Inc.) was applied onto the substrates in one coat, and dried for 30 minutes (dry film thickness 0.09 mils). A two-component isocyanate based prime composition (ESC25/ECH391) was then applied (dried film thickness of 1.48 mils), and dried at room temperature for one half hour before a basecoat was applied. A basecoat of T409 Envirobase Black (dried film thickness of 0.38 mils) was then applied and dried at room temperature before the application of clearcoat DC4000/DCH3085 (dried film thickness of 2.24 mils). The multi-layered coating was cured at room temperature for over 24 hours before an adhesion test was performed.

The results reported in Table 6 show that using soy based cleaner improves the adhesion of coatings to the polymeric substrates.

TABLE 6

| Example | Solvent or solvent blend cleaner | Cross-Hatch adhesion on PP (%) Polypropylene substrate | 90° Peel Strength (N/mm) Polypropylene substrate | 90° Peel Strength (N/mm) TPO substrate |
|---|---|---|---|---|
| 39 (Comparative) | Acetone | 8 | 0.123 | 0.378 |
| 40 (Comparative) | OXSOL | 63 | 0.143 | 0.475 |
| 41 (Comparative) | 16.4% Acetone/83.6% OXSOL by weight | 96.5 | 0.229 | 0.412 |
| 42 | ENVIROGREEN EXTREME SG[5] | 100 | 0.264 | 0.393 |
| 43 | 20% ENVIROGREEN EXTREME SG/13.1% Acetone/66.9% OXSOL by weight | 100 | 0.469 | 0.447 |

[5]Soy-based cleaner and degreaser (containing a fatty acid ester) available from Asburn Chemical Technologies (Houston, TX)

In view of the foregoing description and examples the present invention thus relates inter alia to the subject matter of the following clauses though being not limited thereto.

Clause 1: A resinous adhesion promoter composition comprising: (a) a random copolymer having first and second constitutional monomeric units, the first monomeric units comprising halogen and/or a pendant organic group having six or more carbon atoms and the second monomeric units comprising an active hydrogen-containing functional group; and (b) one of either (i) a non-reactive adhesion promoter or (ii) a reaction mixture comprising a first component and a second component, at least one of the first and second components having functional groups being reactive with the active hydrogen-containing functional groups of the random copolymer.

Clause 2: The composition of clause 1 comprising the reaction mixture (ii), wherein the first component of reaction mixture (ii) comprises a hydroxyl functional component and the second component of reaction mixture (ii) comprises an isocyanate.

Clause 3: The composition of clause 1 comprising the non-reactive adhesion promoter (i) wherein the non-reactive adhesion promoter comprises a polyolefin or a chemically modified polyolefin.

Clause 4: The composition of any of the preceding clauses, wherein the first monomeric units comprise monomeric units derived from cycloalkyl(meth)acrylate or aryl (meth)acrylate.

Clause 5: The composition of any of the preceding clauses, wherein the first monomeric units comprise 20-95 wt. % of the random copolymer based on the total solids weight of the random copolymer.

Clause 6: The composition of any of the preceding clauses, wherein the first monomeric units comprise monomeric units derived from isobornyl(meth)acrylate.

Clause 7: The composition of any of the preceding clauses, wherein the second monomeric units comprise a carboxyl group and/or a hydroxyl group.

Clause 8: The composition of any of the preceding clauses, wherein the second monomeric units comprise 5-90 wt. % of the random copolymer based on the total solids weight of the random copolymer.

Clause 9: The composition of any of the preceding clauses, wherein the random copolymer comprises further monomeric units different from the first and second monomeric units, the further monomeric units being derived from ethylenically unsaturated monomers, preferably from alkyl (meth)acrylates, wherein the alkyl group has one to five carbon atoms.

Clause 10: The composition of clause 9, wherein the further monomeric units comprise up to 90 wt. % of the random copolymer based on the total solids weight of the random copolymer.

Clause 11: A method of treating a polymeric substrate comprising (1) cleaning at least a portion of a polymeric substrate, and (2) applying a resinous adhesion promoter composition as defined in any one of preceding clauses 1 to 10 onto the cleaned portion.

Clause 12: The method of clause 11, wherein the plastic substrate comprises polypropylene and wherein the resinous adhesion promoter composition comprises the reaction mixture (ii).

Clause 13: The method of any one of clauses 11 or 12, wherein step (1) comprises cleaning the plastic substrate with a cleaning composition comprising a fatty acid ester.

Clause 14: The method of clause 13 wherein the cleaning composition further comprises a solvent.

Clause 15: The method of any one of clauses 11 to 14, wherein the resinous adhesion promoter composition is applied directly onto the cleaned portion of the substrate, step (2) directly following step (1) with no steps in between.

Clause 16: The method of any one of clauses 11 to 15, further comprising applying a second coating composition directly onto the resinous adhesion promoter composition or a coating layer formed therefrom.

Clause 17: The method of clause 16, wherein the second coating composition comprises a basecoat composition and/or a clearcoat composition.

Clause 18: A multi-layer coating comprising: a first coating layer formed from a resinous adhesion promoter composition as defined in any one of preceding clauses 1 to 10 applied over at least a portion of a polymeric substrate; and a second coating layer formed from a basecoat composition and/or a clearcoat composition applied over at least a portion of the first coating layer.

Clause 19: The multi-layer coating of clause 18 wherein the polymeric substrate comprises polypropylene and the resinous adhesion promoter composition comprises the reaction mixture (ii).

Clause 20: A substrate at least partially coated with the resinous adhesion promoter composition as defined in any one of preceding clauses 1 to 10 or the multilayer coating of any one of preceding clauses 18 or 19.

Whereas particular aspects of this invention have been described above for purposes of illustration, it will be evident to those skilled in the art that numerous variations of the details of the present invention may be made without departing from the invention as defined in the appended claims.

The invention claimed is:

1. A solvent-borne resinous adhesion promoter coating composition comprising:
    (a) a random copolymer having first and second constitutional monomeric units, the first monomeric units comprising functional groups that promote adhesion to a polymeric substrate and monomeric units derived from cycloalkyl(meth)acrylate and/or aryl(meth)acrylate, and the second monomeric units comprising an active hydrogen containing functional group, wherein the random copolymer has a number average molecular weight of up to 20,000 g/mol;
    (b) a non-reactive adhesion promoter that does not react with other components of the solvent-borne coating composition, wherein the non-reactive adhesion promoter comprises a polyolefin or a chemically modified polyolefin; and
    (c) a solvent, wherein when the solvent-borne coating composition is applied to a substrate and cured, the coating composition forms a coating layer.

2. The composition of claim 1, wherein the first monomeric units comprise 20-95 wt. % of the random copolymer based on the total solids weight of the random copolymer.

3. The composition of claim 1, wherein the first monomeric units comprise monomeric units derived from isobornyl(meth)acrylate.

4. The composition of claim 1, wherein the second monomeric units comprise a carboxyl group and/or a hydroxyl group.

5. The composition of claim 4, wherein the second monomeric units comprise 5-90 wt. % of the random copolymer based on the total solids weight of the random copolymer.

6. The composition of claim 1, wherein the random copolymer comprises further monomeric units different from the first and second monomeric units, the further monomeric units being derived from ethylenically unsaturated monomers comprising alkyl(meth)acrylates, wherein the alkyl group has one to five carbon atoms.

7. The composition of claim 6, wherein the further monomeric units comprise up to 90 wt. % of the random copolymer based on the total solids weight of the random copolymer.

8. The composition of claim 1, wherein the non-reactive adhesion promoter comprises a halogenated polyolefin.

9. The composition of claim 1, wherein the random copolymer at least partially encapsulates the non-reactive adhesion promoter.

* * * * *